(12) United States Patent
Myburgh

(10) Patent No.: US 6,827,472 B1
(45) Date of Patent: Dec. 7, 2004

(54) ILLUMINATED HVAC DUCT/ADVERTISING CARD HOLDER FOR VEHICLES

(76) Inventor: Herman Myburgh, 6995 Craddock La., Lascassas, TN (US) 37085

(*) Notice: Subject to any disclaimer, the term of this patent is extended or adjusted under 35 U.S.C. 154(b) by 0 days.

(21) Appl. No.: 10/438,903

(22) Filed: May 16, 2003

Related U.S. Application Data

(60) Provisional application No. 60/431,230, filed on Dec. 6, 2002.

(51) Int. Cl.[7] ................................................ B60Q 3/02
(52) U.S. Cl. .................... 362/480; 362/479; 362/547; 362/125; 362/218; 362/373; 40/124.02; 40/205; 40/574
(58) Field of Search .......................... 362/23, 29, 30, 362/31, 459, 478, 479, 480, 484, 488, 490, 493, 543, 544, 546, 547, 125, 126, 217, 218, 362, 373; 16/221, 224, 225, 231, 252, 254, 260, 268, 269; 40/124.01, 124.02, 124.07, 200, 205, 541, 553, 556, 564, 573, 574, 579; 156/306.6, 313

(56) References Cited

U.S. PATENT DOCUMENTS

| | | | | |
|---|---|---|---|---|
| 3,210,875 A | * | 10/1965 | Schwenkler | .................. 40/553 |
| 3,279,472 A | * | 10/1966 | Toman et al. | .................. 16/225 |
| 3,593,448 A | * | 7/1971 | Schoepf et al. | ................ 40/574 |
| 4,088,881 A | * | 5/1978 | Neer et al. | .................... 362/223 |
| 4,157,584 A | * | 6/1979 | Bhatt | .......................... 362/479 |
| 4,387,415 A | * | 6/1983 | Domas | ........................ 362/479 |
| 4,419,717 A | | 12/1983 | Price et al. | |
| 4,574,336 A | * | 3/1986 | Mikalonis | .................... 362/479 |
| 5,128,850 A | * | 7/1992 | Juodvalkis | .................... 362/352 |
| 5,457,905 A | * | 10/1995 | Kaplan | ......................... 40/574 |
| 5,752,760 A | | 5/1998 | Dealey, Jr. et al. | |
| 5,857,758 A | * | 1/1999 | Dealey et al. | ............... 362/551 |
| 6,082,879 A | * | 7/2000 | Myburgh | ..................... 362/480 |
| 6,121,166 A | | 9/2000 | Wood et al. | |
| 6,176,747 B1 | | 1/2001 | Rowe et al. | |

* cited by examiner

Primary Examiner—John Anthony Ward
Assistant Examiner—Ismael Negron
(74) Attorney, Agent, or Firm—Richard C. Litman

(57) ABSTRACT

Combination light fixture/HVAC duct/ad card holder for transit vehicle has roof mounted light fixture having a housing extending inboard to receive roof fasteners readily accessible through a cover strip. A single panel provides ad display serves as air duct with air vents and is supported by a detachable hinge at the light housing. In another embodiment the lamp housing is below the card panel. Combination outboard extrusions form a wiring trough and attachment for duct lower wall, and inboard extrusions form detachable hinge, supporting display panel and card holder. Upper bracket extrusion receives panel and card. Extrusions are attached to display panel by double-sided adhesive tape. Light fixture has ballast member accessible from inside lamp housing.

23 Claims, 12 Drawing Sheets

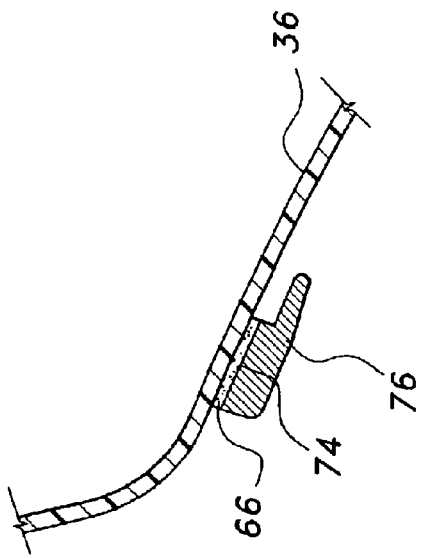
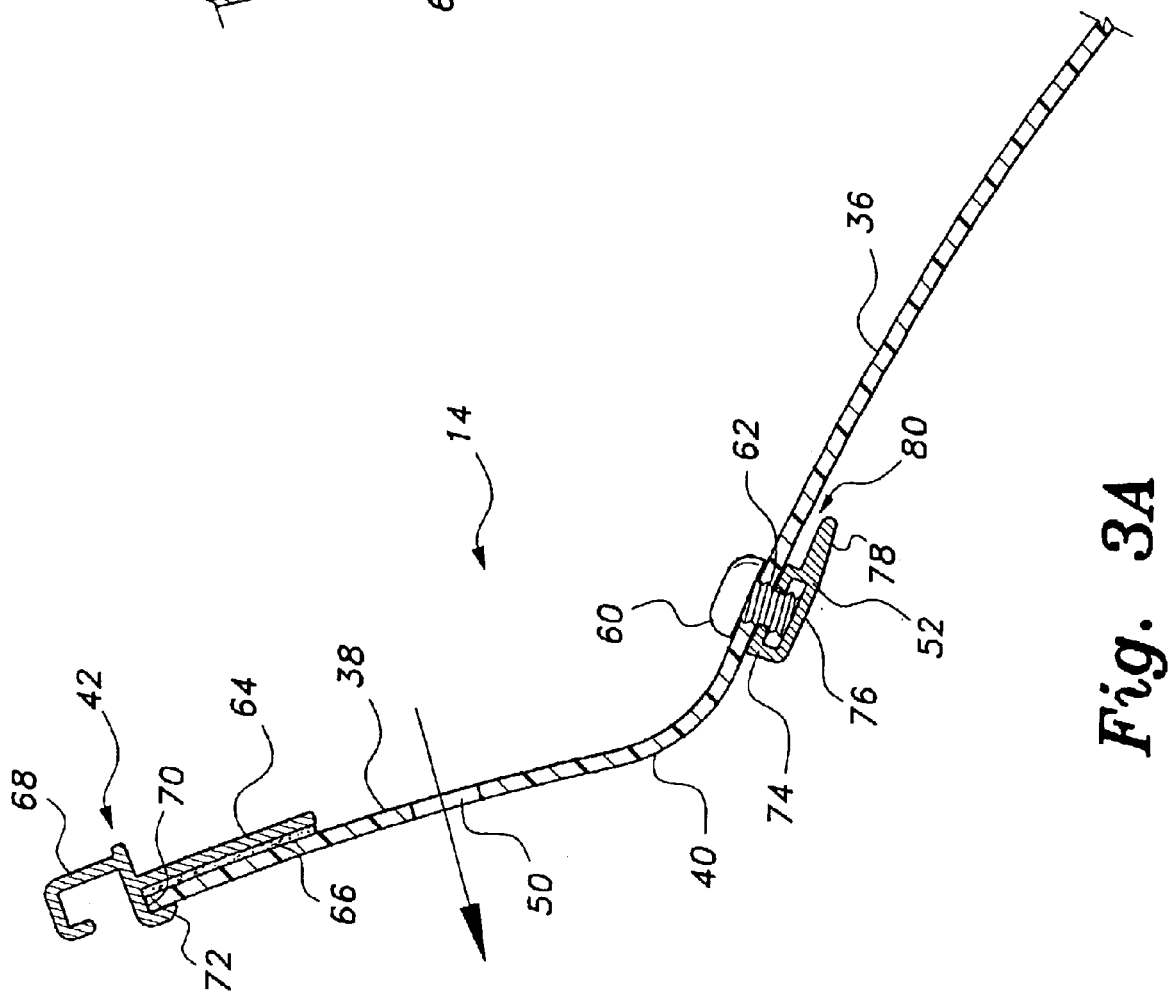

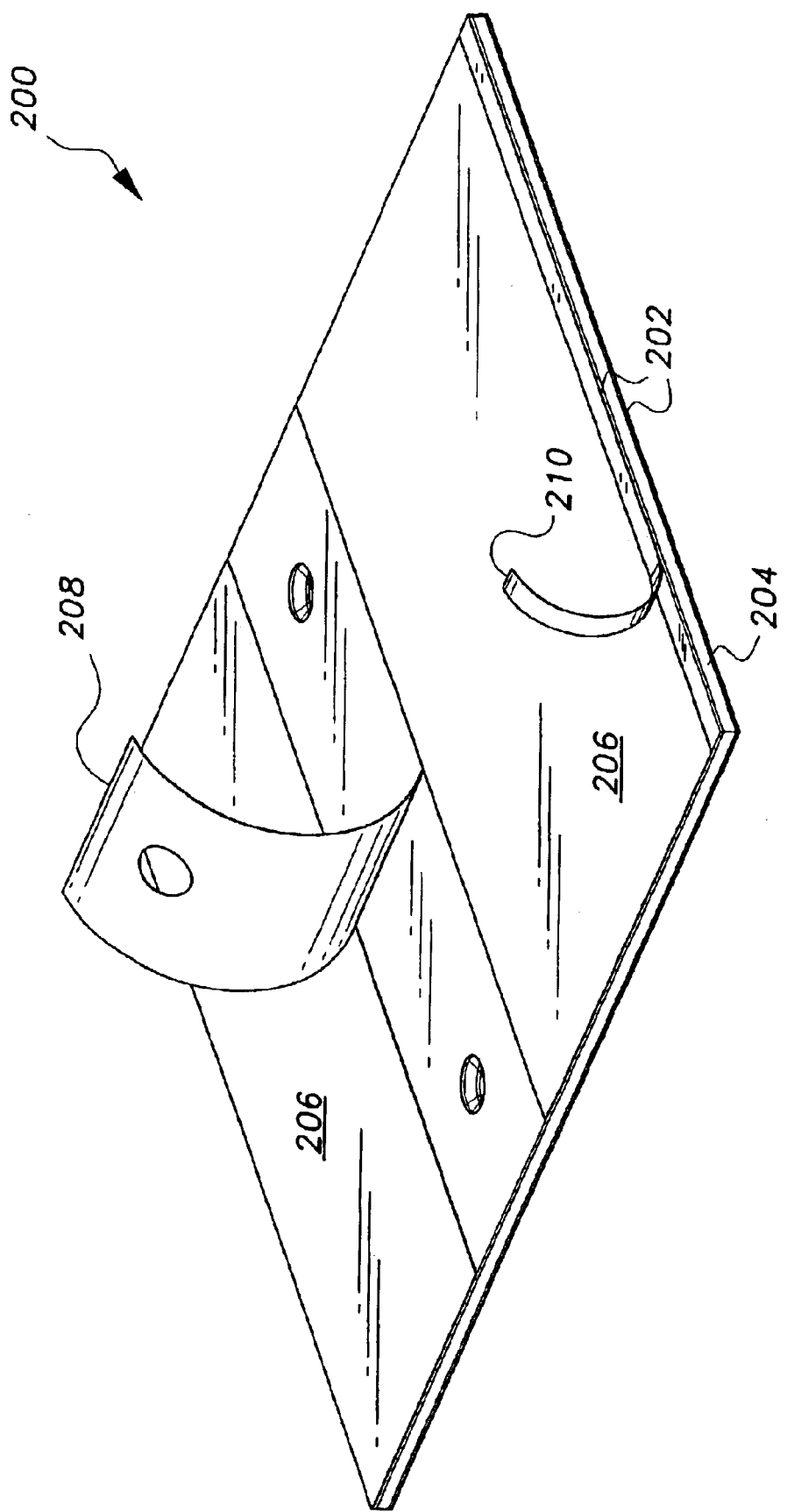

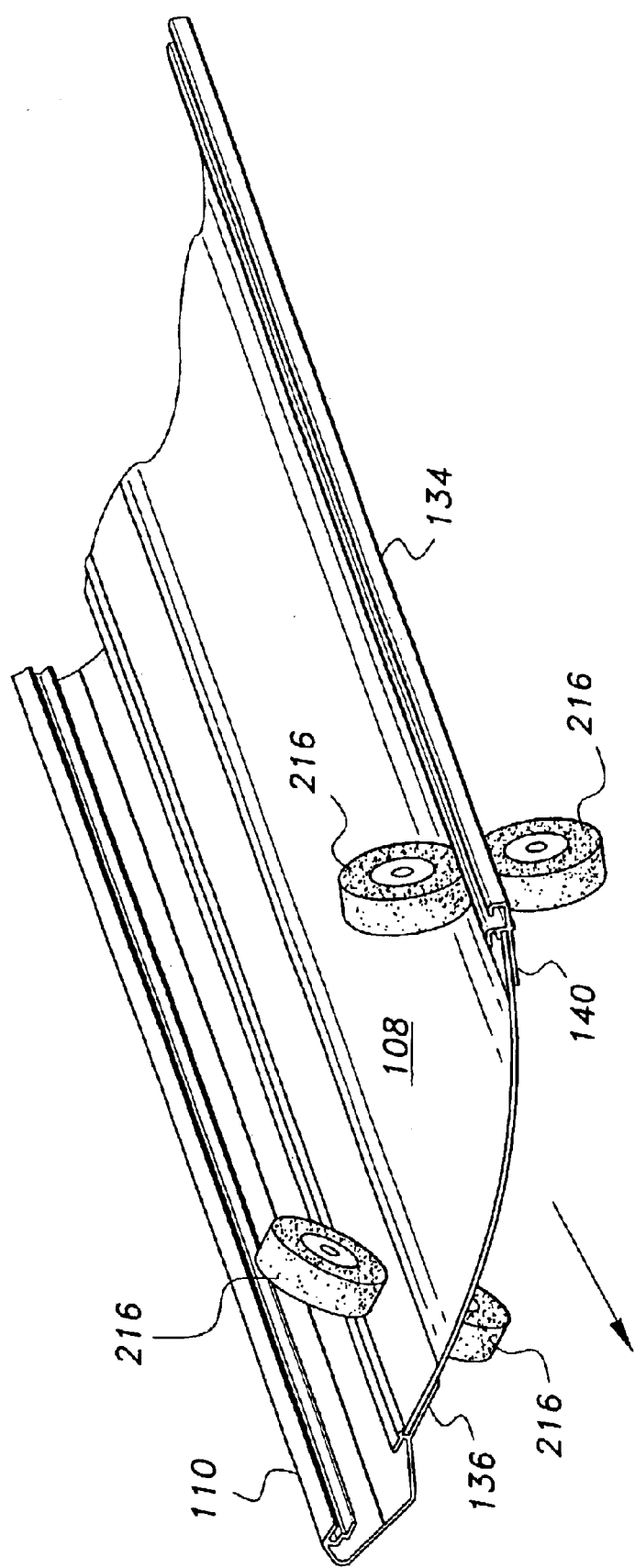

US 6,827,472 B1

ILLUMINATED HVAC DUCT/ADVERTISING CARD HOLDER FOR VEHICLES

CROSS REFERENCE TO RELATED APPLICATION

Applicant claims the benefit of U.S. Provisional Application No. 60/431,230 filed on Dec. 6, 2002.

BACKGROUND OF THE INVENTION

1. Field of the Invention

The present invention relates to illumination and ventilation devices. More particularly, the present invention relates to combination light fixture, and heating, ventilating and air conditioning (HVAC) ducts having advertising panels and useful for public transportation vehicles.

2. Description of the Related Art

Providing adequate light, comfortable conditions, and advertising locations within public transportation vehicles such as buses, while additionally avoiding interference with the driver's ability to safely operate the vehicle has been the goal of previous inventors. Light fixtures, which provide light for passengers to read or move about the aisle, must not interfere with the driver's ability to see out the windows. Efficient air duct systems are necessary to move heated or cooled air around the vehicle for the comfort of the passengers. The owners of such vehicles typically like to generate additional revenue by allowing advertisers to display information about their products within the vehicle, thereby enhancing the revenue generated by operating the vehicle. The present inventor has provided a combination light fixture/HVAC duct/advertising panel combining ease of installation, ease of servicing, ease of access to the various components, safety, and proper light distribution in his previous invention, U.S. Pat. No. 6,082,879, issued Jul. 4, 2000 and hereby incorporated by reference. The present invention includes inventive improvements made by the present inventor over his previous inventive combination light fixture/HVAC duct/advertising panel disclosed in his previous patent referenced above. It would be desirable to provide an improved system which is more attractive in design, has fewer parts, is more easily accessible for maintenance, is less expensive to construct, is easily installed on a larger variety of vehicle configurations, and provides for ventilation to passengers along the length of the fixture.

U.S. Pat. No. 4,419,717, issued Dec. 6, 1983, to Price et al. describes a ceiling supported light fixture wherein the ballast is mounted on the inside of the light housing.

U.S. Pat. No. 5,752,760, issued May 19, 1998, and U.S. Pat. No. 5,857,758, issued Jan. 12, 1999, both to Dealey, Jr. et al. describe a combination air duct, lighting system, and advertising panel for a mass-transit vehicle which includes a light source with its top portion attached to the ceiling of the vehicle and its bottom portion attached to an advertising panel for holding advertising cards. During assembly, an adhesive glue may be used instead of other fastening means to hold the end fittings of the panel in place.

U.S. Pat. No. 6,121,166, issued Sep. 19, 2000, to Wood et al., describes a double-sided pressure sensitive adhesive that may be used to bond relatively flat articles on surfaces using pinch rollers.

U.S. Pat. No. 6,176,747 B1, issued Jan. 23, 2001, to Rowe et al. describes a cover for concealing screws with a hole for accessing the screws.

None of the above inventions and patents, taken either singly or in combination, is seen to describe the instant invention as claimed. Thus a combination light fixture/HVAC duct/advertising cardholder having the above-mentioned improvements is desired.

SUMMARY OF THE INVENTION

The improved combination light fixture/HVAC duct/advertising card holder for a mass transit vehicle has, in one embodiment, a roof mounted light fixture. This embodiment has a single panel formed to provide a display area for advertising cards and serving as an air duct having a duct lower wall which contains air vents for delivering air to passengers and is removably fastened to a wall by means of a flange and fasteners. The panel is supported by a detachable hinge at the overhead light housing for easy access to the air duct.

Another embodiment provides a lamp housing spaced from the wall by a horizontal duct lower wall having air vents and attached by an extrusion having formed an electrical wiring trough for placement of wiring for the light fixtures. The lamp housing, on its inboard side has a detachable hinge for supporting the advertising display panel. The display panel is supported at its upper end by a bracket supported by the roof and having removable fasteners covered by a strip having access holes. The bracket and the detachable hinge are extrusions which are attached to upper and lower edges of the display panel by means of double-sided adhesive tape and which also include opposing slots for receiving advertising cards. The light fixture has a ballast mounted on a ballast plate which is accessible by removing the lens and lamp and which has access to a fuse and LED status readout. The ballast plate and ballast may be removed through the interior of the light fixture housing for replacement without accessing the air duct. Interior vertical hanger straps support the light fixture. The display panel is supported at its upper end by a bracket supported by the roof and having removable fasteners covered by a strip having access holes.

Accordingly, it is a principal object of the invention to provide a combination light fixture/HVAC duct/and advertising card display panel having an attractive and simple design.

It is another object of the invention to provide a system as above which may fit a large variety of public transportation vehicle configurations.

It is a further object of the invention to provide a system as above which provides easy access for maintenance, and advertising card changing.

Still another object of the invention is to provide a system as above which provides ventilation along its length to passengers.

Yet another object of the invention is to provide a system as above incorporating multi duty extrusions to provide for advertising panel detachable hinging, removable securing slots for mounting advertising cards, and a wiring trough for neatly holding necessary electrical wiring for the light fixtures.

Still another object of the invention is to employ double-sided tape for ease in attachment of panels to extrusions and cardholders.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3A is a detail end view of the HVAC duct/advertising panel of FIG. 1 showing a detachable hinge and advertising card holder member.

FIG. 3B is a detail end view similar to that of FIG. 3A showing the advertising card holder member attached by double-sided tape.

FIG. 7A is a perspective view showing the material components of the aluminum composite panel useful in the present invention.

FIG. 8A is a perspective view of an advertising card holding panel useful in the present invention, showing the pinch roll assembly process.

Similar reference characters denote corresponding features consistently throughout the attached drawings.

DETAILED DESCRIPTION OF TEE PREFERRED EMBODIMENTS

Figure 1:
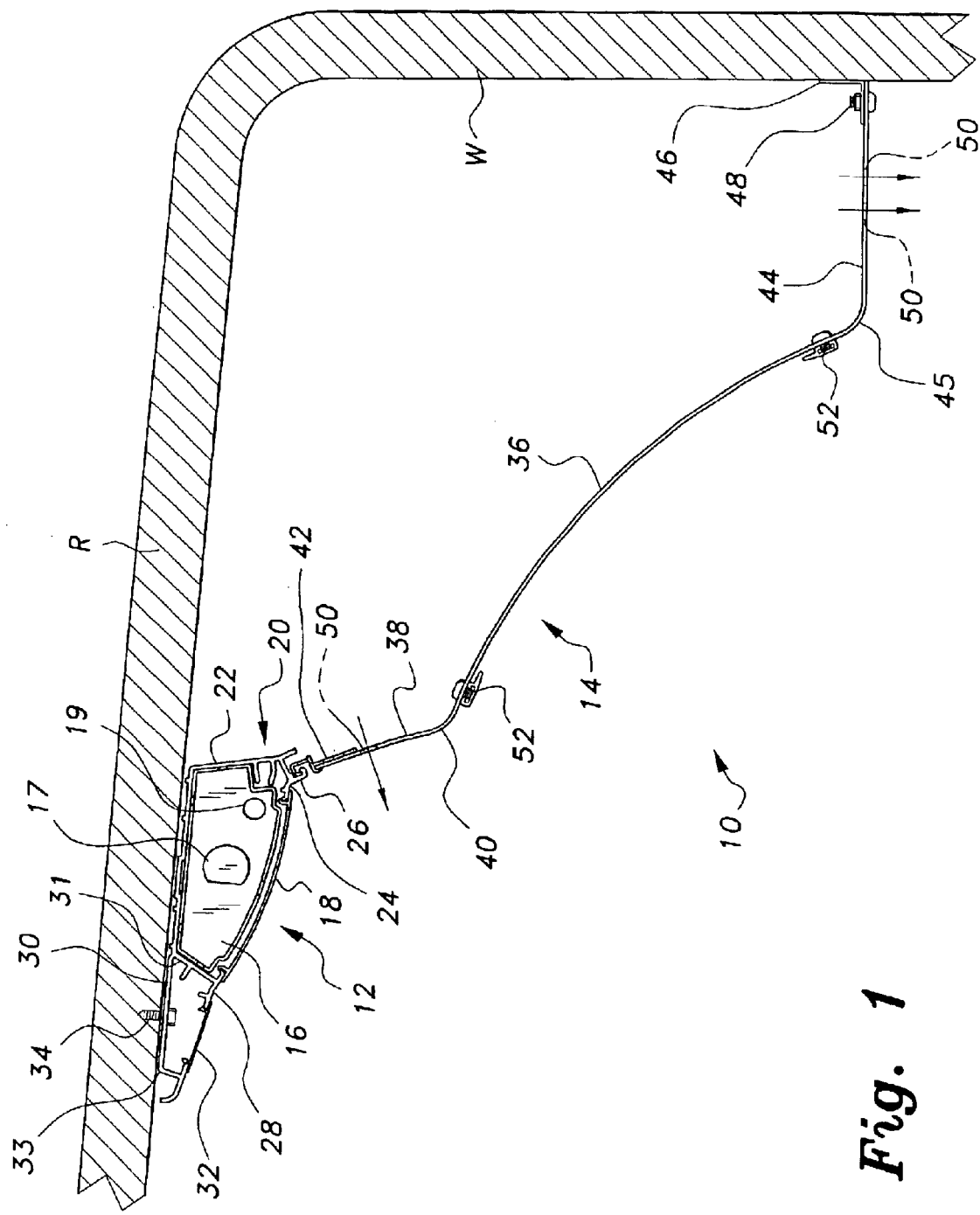
FIG. 1 is an end elevation view of a first embodiment of a combination light fixture/HVAC duct/advertising cardholder according to the present invention.

An improved combination light fixture/HVAC duct/advertising card holder for a mass transit vehicle has, in one embodiment, a single panel is formed to provide a display area for advertising cards and serve as an air duct having a duct lower wall which contains air vents for delivering air to passengers and is removably fastened to a wall by means of a flange and fasteners. The panel is supported by a detachable hinge at the overhead light housing for easy access to the air duct.

Another embodiment provides a lamp housing spaced from the wall by a horizontal duct lower wall having air vents and attached by an extrusion having formed an electrical wiring trough for placement of wiring for the light fixtures. The lamp housing, on its inboard side has a detachable hinge for supporting the advertising display panel. The novel bracket and the detachable hinge extrusions are attached to upper and lower edges of the display panel by means of double-sided adhesive tape and include opposing slots for receiving advertising cards. The light fixture has a ballast unit mounted on a ballast plate accessible by removing the lens and lamp and which has access to a fuse and LED status readout. The ballast plate and ballast may be removed through the interior of the light fixture housing for replacement without accessing the air duct.

Referring to FIGS. 1-3B, there is shown a first embodiment of the improved inventive combination light fixture/HVAC duct/advertising card holder system for a mass transit vehicle having a roof mounted light fixture and combined duct lower wall and& advertising card holder panel generally designated by reference number 10. A number of identical systems or assemblies may be aligned along the roof of a vehicle and placed adjacent to each other to form continuous ducts and accommodate finite length fluorescent lamps. Light solid rods may take the place of fluorescent lamps as taught in the prior art. Combination system 10 includes an upper light fixture assembly 12 and a combined cardholder and lower vent panel 14.

Light fixture assembly 12 includes opposing light fixture end caps 16, each having lamp sockets 17, and light fixture access apertures 19. Light fixture assembly 12 further includes a light housing 20 having a light fixture surrounding shell 22 supporting light fixture lens 18. Light fixture surrounding shell 22 has a lower outboard end portion 24 which includes a female hinge bracket 26 and an upper inboard end portion 28 which is adjacent the roof R. (The use of terms outboard and inboard relate to relative positions within the public transportation vehicle upon which the system is installed.) Light housing 20 has a roof attachment portion 30 separated from the light housing surrounding shell by a separating wall 31. Roof attachment portion 30 is generally triangular in shape, having a lower wall substantially made up of snap-in strip 32 and snap support flanges, and an upper wall 33 attached to the roof by fasteners 34, each wall extending inboard from separating wall 31 to meet along its inboard end.

Combined card holder and lower vent panel 14 includes concave shaped card display portion 36, upper vent portion 38 separated from card display portion 36 by upper bend 40, and lower vent portion 44, separated from card display portion 36 by lower bend 45. Combined panel 14 is supported along its upper edge by upper hinge member 42 detachably mounted in light housing female hinge bracket 26 and removably secured to wall attachment bracket 46 by means of fasteners 48. Combined panel 14 has elongated vents 50 spaced along upper vent portion 38 and lower vent portion 44 for venting air from the duct to passengers. Card holding members 52 are vertically spaced and mounted to concave card panel display portion 36 along upper bend 40 and lower bend 45 in a manner as to securely hold advertising cards in slots formed by opposing lips thereof.

Figure 2:
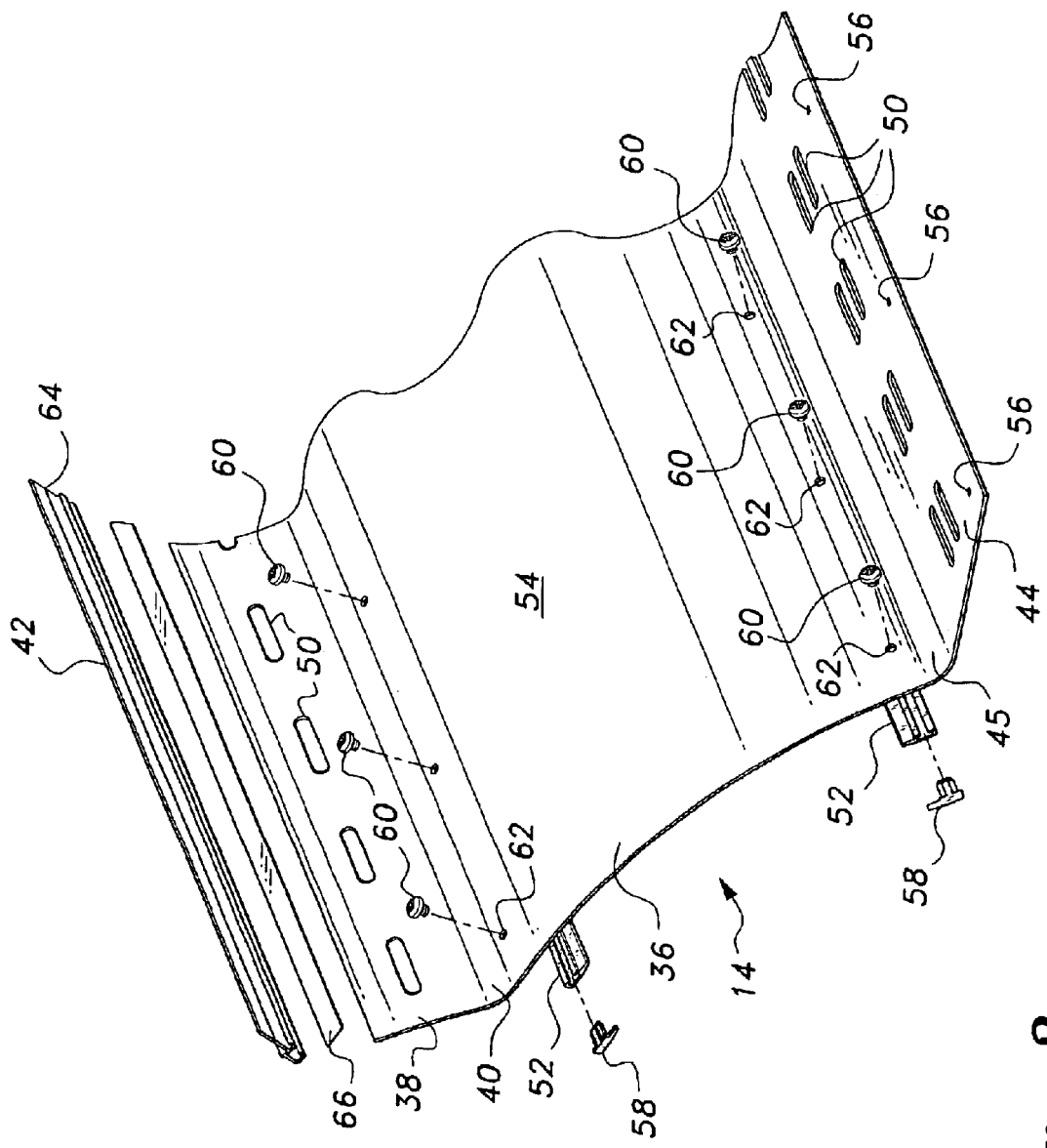
FIG. 2 is an exploded view of the embodiment of FIG. 1, looking at the backside of the HVAC duct/advertising cardholder.

As more clearly see in FIG. 2, card holding members have end finishers 58 secured at each end of card holding members 52 by an inner leg inserted therein to give a finished appearance. Card holding member fasteners 60 secure cardholding members 52 to card display portion 36 by means of fastening holes 62 spaced along the panel. Combined panel upper hinge member 42 includes a connecting wall 64 for attachment in a preferred manner to combined panel 14 along its upper edge by double-sided adhering tape 66, although mechanical fasteners may also be used. As more clearly seen in FIG. 3A, upper hinge member 42 has a male hinge hook portion 68 extending upward from a horizontal body to engage a similar hook portion of a female hinge. Hinge 42 defines a panel end locating surface 70 along the horizontal body on the side opposite the hook portion 68 as defined by a slot formed by combined panel upper hinge member connecting wall 64 and a parallel panel end capturing lip 72 extending from the end of the horizontal body.

As described above, double-sided adhering tape 66 permanently connects the upper edge of combined panel 14 to connecting wall 64. As further shown in FIG. 3A, card holding member 52 is held in place on panel portion 36 by fastener 60 through fastening hole 62, fastener 60 being received by mounting surface 74 and reaching the back side of mounting face 76, in a manner such that card retainer lip 78 forms a card holding slot 80. As seen in FIG. 3B, the use of fastener 60 may be avoided by using double-sided tape 66 to permanently affix card holding member mounting surface 74 to combined panel portion 36. The male hinge hook portion 68 of upper hinge member 42 allows for rotation of the attached combined panel 14 relative to the female hinge of hinge bracket 26 and detachment of the male hinge and panel from the female hinge bracket by lifting the panel upward and outward. (See the present inventor's previously incorporated prior U.S. Pat. No. 6,082,879, FIGS. 3 and 4 and descriptive language in column 7, lines 27–57 for more detailed description of the configuration and operation of the detachable hinge as employed in the present invention.)

Figure 4A:
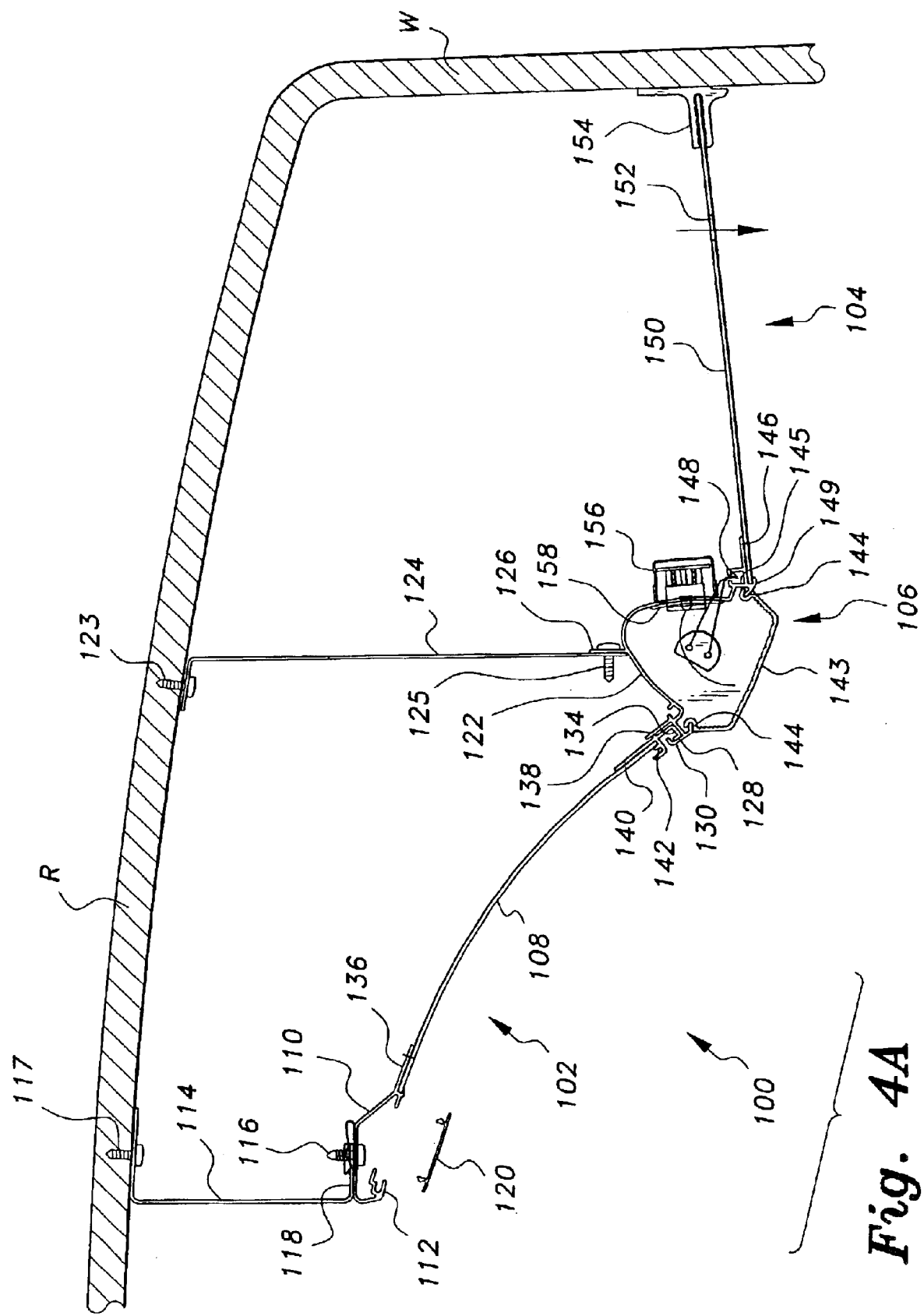
FIG. 4A is an end elevation view of a second embodiment of an HVAC duct/advertising cardholder according to the present invention.
Figure 4B:
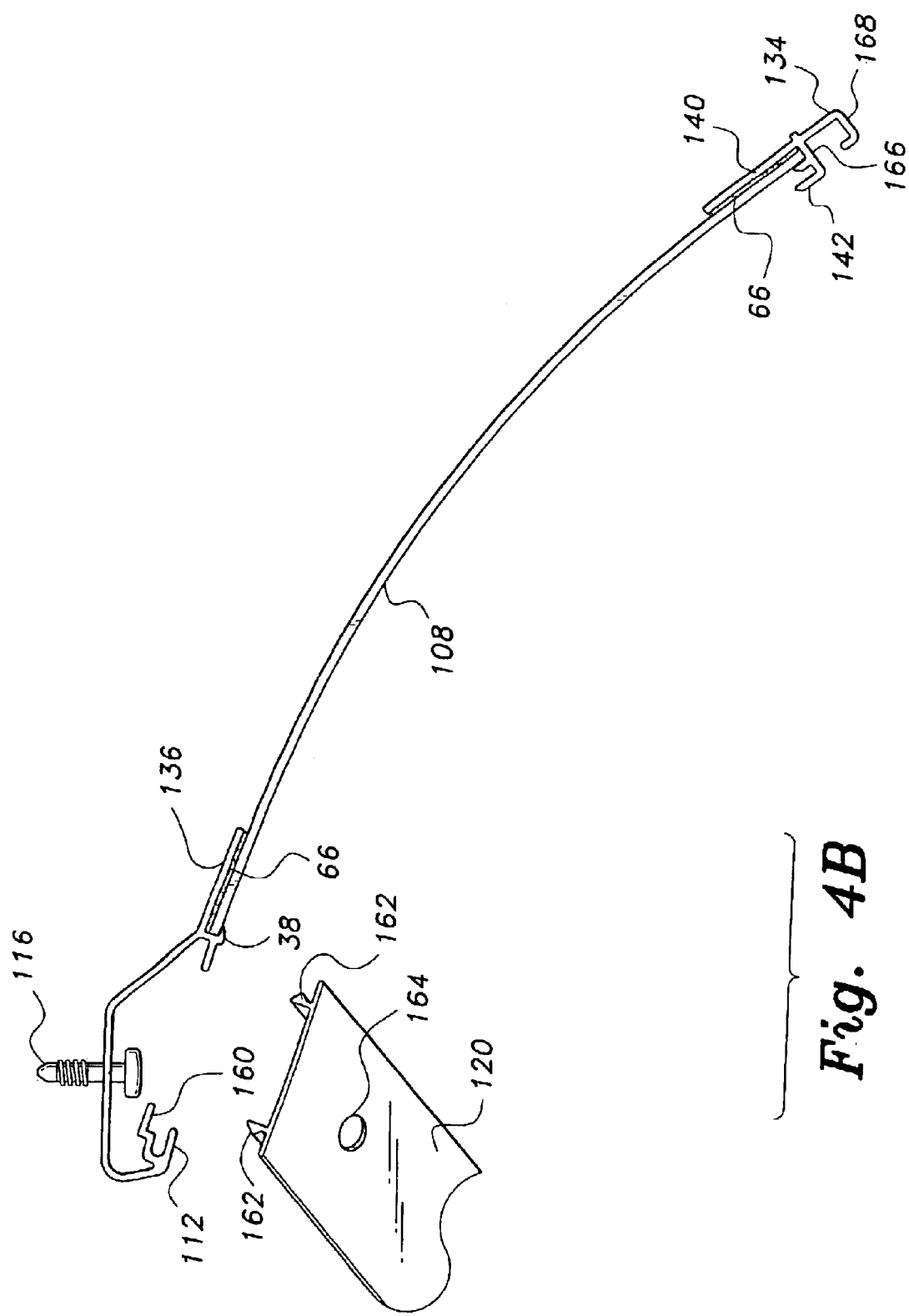
FIG. 4B is a partially broken away end view of an advertising panel of the embodiment of FIG. 4A.

Referring to FIGS. 4A and 4B, there is shown another embodiment of an improved combination light fixture/ HVAC duct/advertising card holder for a mass transit vehicle of the present invention having the advertising card panel portion and a lower duct panel portion separated by a light fixture mounted at the lower edge of the advertising card panel, and generally designated by reference number 100. Duct panel and light fixture system 100 includes a card panel portion 102, a duct panel portion 104 and a light assembly 106, the card panel portion having a concave card display panel 108 having an upper panel connecting bracket 110 connected along the upper edge of the panel. Upper panel connecting bracket 110 is generally rectangular in shape and has an upper card receiving slot 112 while serving as a removable connector to the vertical upper support wall 114 by means of fasteners 116 connecting the upper wall of bracket 110 by means of fasteners 116 with perpendicular support wall fastener flange 118 extending outward from the base of wall 114. Bracket 110 supports lower cover strip 120 along its base.

Light housing 122 is supported from roof R by vertical light housing support straps 124 attached to roof R by fasteners 123 and by means of light housing support flange 126 with fasteners 125. Light housing 122 incorporates a light housing female panel hinge 128 in its inboard end portion. Concave display panel 108 is attached at its upper end to upper panel connecting wall member 136 located at the base of the outboard outer sloping wall of upper panel connecting bracket 110 lower end. The lower end of concave ear display panel 108 is attached to male panel hinge extrusion member 134 at the surface of male panel connecting member 140 in a manner similar to that of the upper hinge member 42 of the first embodiment. Light housing lens 143 is supported by lens receivers 144 respectively extending inward from light housing inboard end portion 130, the lens snapping into place by hand pressure. The outboard duct panel connector extrusion also includes an upward-opening wiring trough 148 for receiving electric supply lines for the lamp fixture.

The lower horizontal duct panel 150 is connected at its inboard end to light housing duct panel connector 146 in a manner similar to that of male hinge 42 of the first embodiment and at its outboard end to wall W by duct panel wall connector 154. Horizontal duct panel 150 has a plurality of elongated air vents 152 therein for providing ventilation from the duct to the passengers in the vehicle. The outboard lens receiver 144 is mounted on vertical locating leg 145 and forms a capturing lip 149, and with light housing outboard duct panel connector 146, forms a receiver for the outboard duct panel 150. Panel connector 146 has a flat surface for mounting to the edge portion of panel 150 by adhesive such as double-sided tape 66(see FIG. 3A).

Ballast unit 156 is located on ballast plate 158 and assembled with light housing 122 on its outboard side through a rectangular ballast unit opening 159, the ballast plate 158 being longer and wider in dimensions than opening 159 so as to abut the inner side of light housing 122 for removable connection therewith, while ballast unit is held outward in the ventilating duct.

As better seen in FIG. 4B, concave display panel 108 has a male panel hinge extrusion member 134 similar to the male panel hinge of the first embodiment described above, however, an additional advertising card receiving slot is formed by the addition of card receiving wall 142 along the body thereof and inboard and parallel to the capturing lip and the connecting surface of male panel connecting member 140. Male panel hinge extrusion member 134 includes a male panel connecting member 140 for connection with upper concave panel 108 by means such as double-sided tape 66. Card receiving wall 142 is spaced from the capturing lip, both parallel and extending upward from the body thereof which forms upper panel lower end locating surface 166 which receives the lower edge of upper concave panel 108. Male hinge 168 is hook-like in shape and extends from the body of male panel hinge extrusion member 134 in a manner similar to hinge member 42 of the first embodiment described above.

Concave display panel 108 has an upper panel-connecting bracket 110 that is in the general form of a rectangle having an upper card receiving slot 112 opposing card receiving wall 142 of male panel hinge extrusion member 134. Cover strip snap receivers 160 extend from lower and upper portions of bracket 110 to receive cover strip 120 by means of cover strip snaps 162, cover strip 120 being installed such that fastener access holes 164 align with fasteners 116 for removable attachment to support fastener flange 118 of upper support wall 114.

Figure 5:
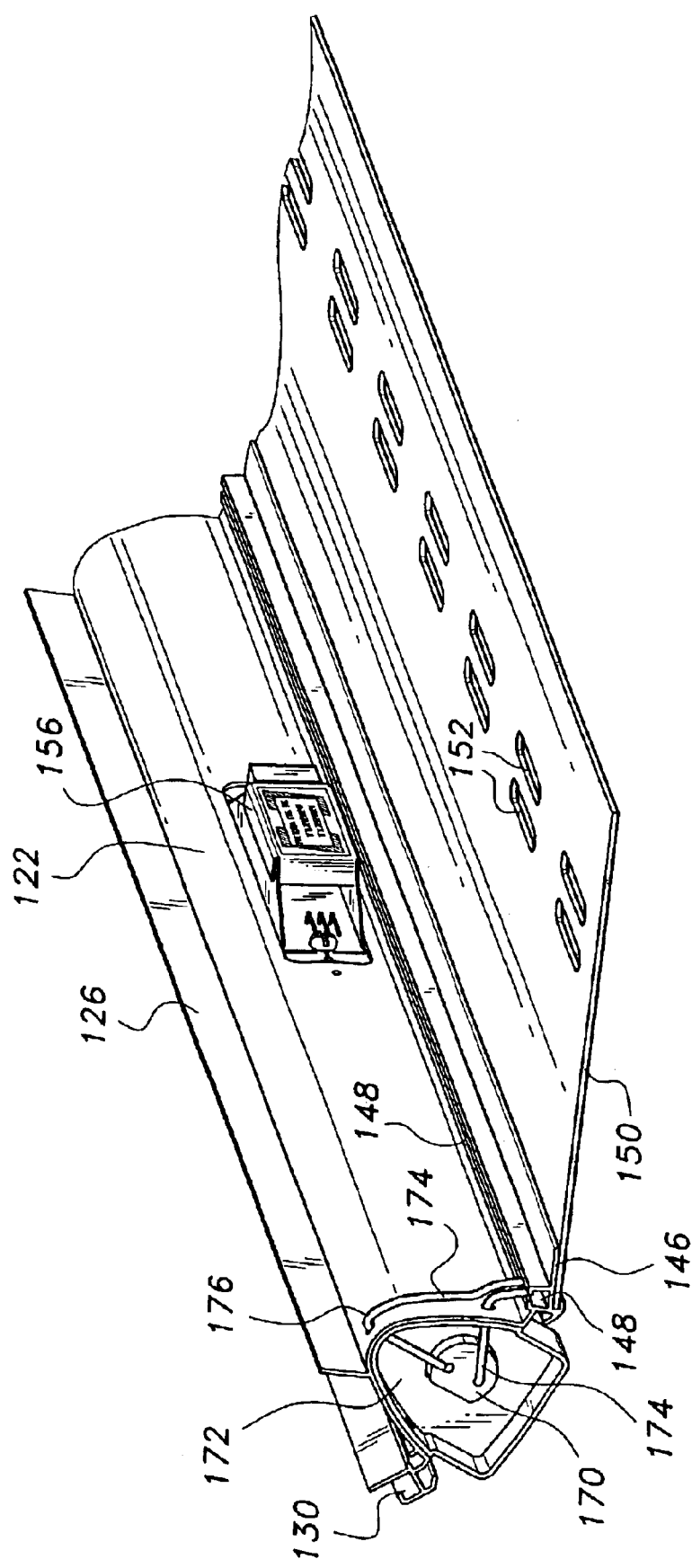
FIG. 5 is a perspective view of the embodiment of FIG. 4A as viewed from the rear of the light fixture and duct panel.
Figure 6:
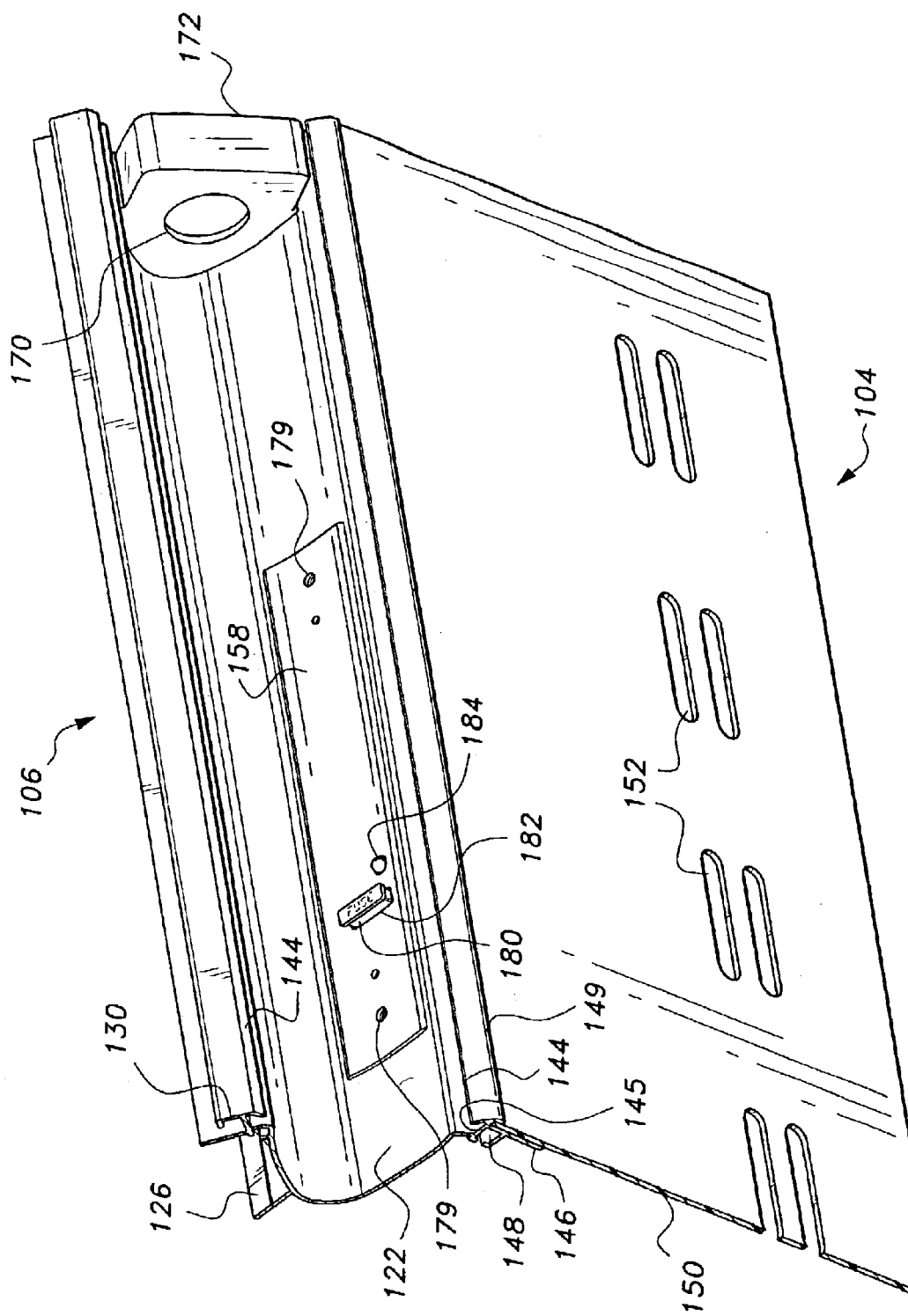
FIG. 6 is a perspective view in section of the embodiment of FIG. 4A showing the inside of the light housing.

Referring to FIGS. 5-6, there are shown perspective views of the duct panel portion 104 and light assembly 106. Light housing 122 has endwalls 172 at either end thereof wherein are centrally mounted lamp sockets 170 for receiving a linear fluorescent bulb (not shown). Electrical wiring 174 is located along wiring trough 148 and extends to lamp sockets 170 through hollow fasteners 176 which serve to permanently attach end walls 172 to light housing 122 at either end thereof. Wiring is attached to lamp ballast unit 156 in a known manner for operation of the lamp.

As illustrated in FIGS. 4A, 5, and 6, ballast 156 is mounted such that upon removal of the lamp lens and lamp, it may be removed from the inside of the housing 122, thereby allowing service to the housing without removing duct panel 150 or upper card display panel 108. This is accomplished by providing a conforming ballast aperture 159 in the housing 122 such that the ballast unit 156 may extend into the air duct formed by duct panel 150. The ballast unit 156 is mounted on a ballast plate 158 that is larger in dimensions than the ballast aperture 159 and is curved to conform to the shape of the housing 122 such that it may be removably mounted on the inner surface by fasteners (not shown) at mounting holes 179. Fuse 180 of ballast unit 156 is accessible on the lamp housing inner side by providing fuse aperture 182 in ballast plate 158, allowing its replacement without removal of the ballast unit 146. Also, a diagnostic LED 184 extends through ballast plate 158 for taking readings of the condition of ballast unit 156 without its removal.

Referring to FIGS. 7A-8B, there are illustrated methods of construction of panels such as for upper concave panel 108. Flat composite panel 200 is preferably of sandwich construction having aluminum skin panels 202 covering each side of a plastic core material 204. The panel is provided with thin plastic protective covering 206 which may be peeled away in desired locations for receiving adhesive materials such as double-sided tape for mounting extruded hardware. For example, inner peel-off strip 208 may expose a clean surface to receive card holding member 52 with double-sided tape or fasteners 60, and edge peel-off strip 210 allow a surface to receive extrusions such as upper panel connecting bracket 110, male. panel hinge member 134, and light housing 120. An example of a preferred composite panel material is DIBOND® composite material made by Alcan Composites USA, Inc., Benton, Ky. in a two-millimeter thickness having two sheets of 0.012" aluminum bonded to a thermoplastic core.

Figure 7B:
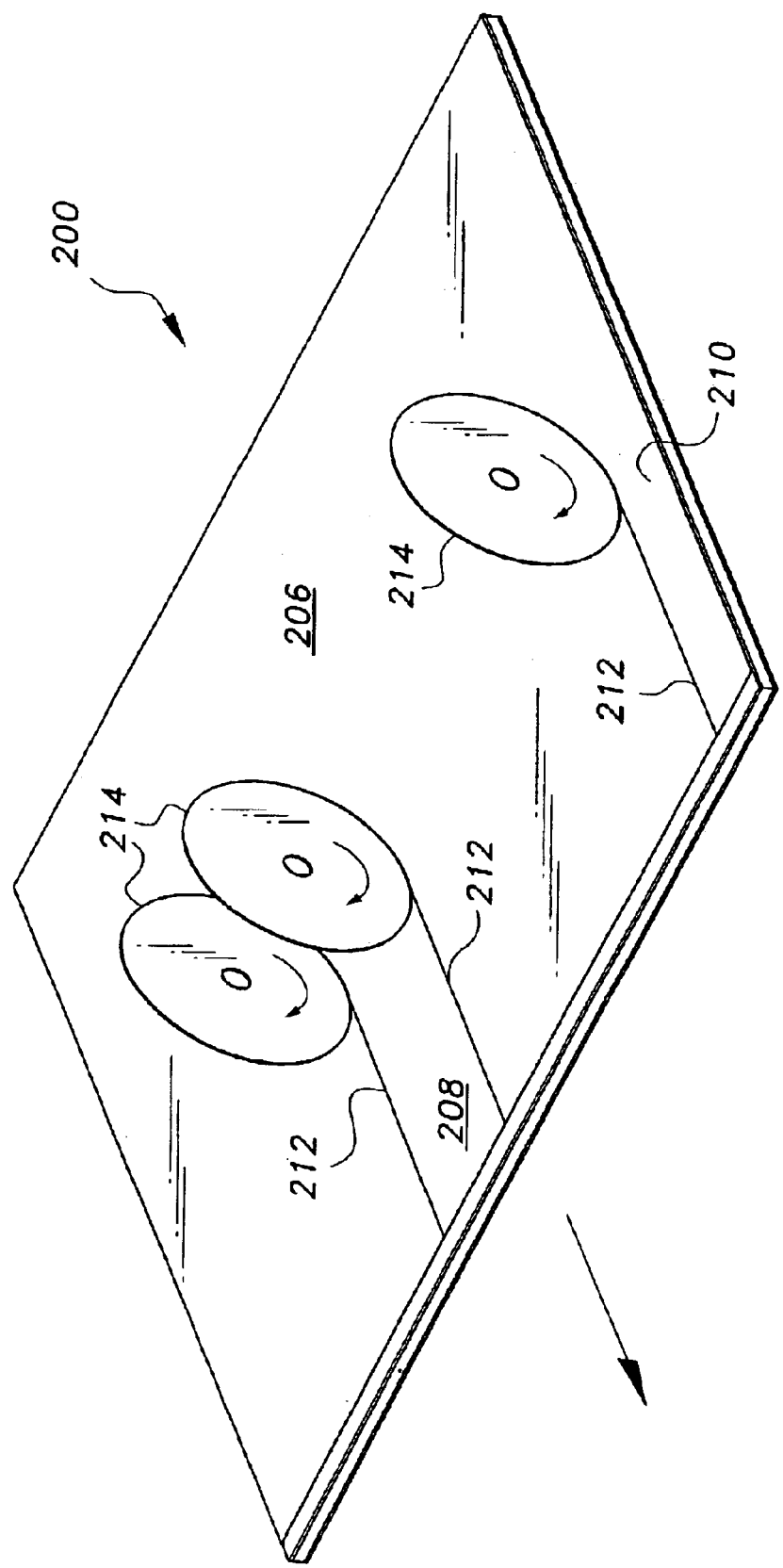
FIG. 7B is a perspective view of a composite panel useful in the present invention showing the protective covering slitting process.
Figure 8B:
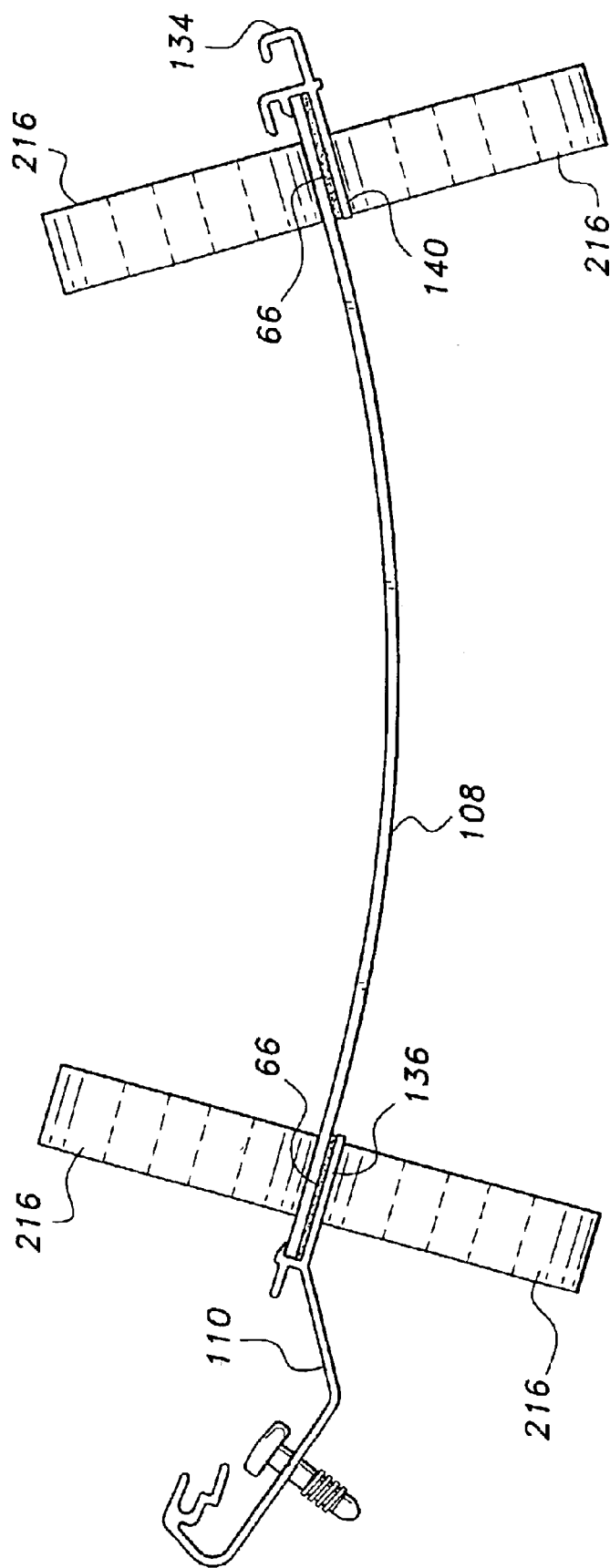
FIG. 8B is an end view of an advertising card assembly process of FIG. 8A.

As illustrated in FIG. 7B slits 212 in protective covering 206 may be made by spring loaded cutting wheels 214 as desired to form peeling strips 208 and 210. Referring to FIGS. 8A and 8B, upper concave panel 108 is attached simultaneously with connecting wall member 136 of bracket 110 and male hinge panel connecting member 140 of hinge member 134 with double-sided tape 66 by two sets of opposing pinch rollers 216. The pinch rollers may be powered for rotation and the panel 108 fed through the rollers to connect the extruded members as shown.

Figure 9:
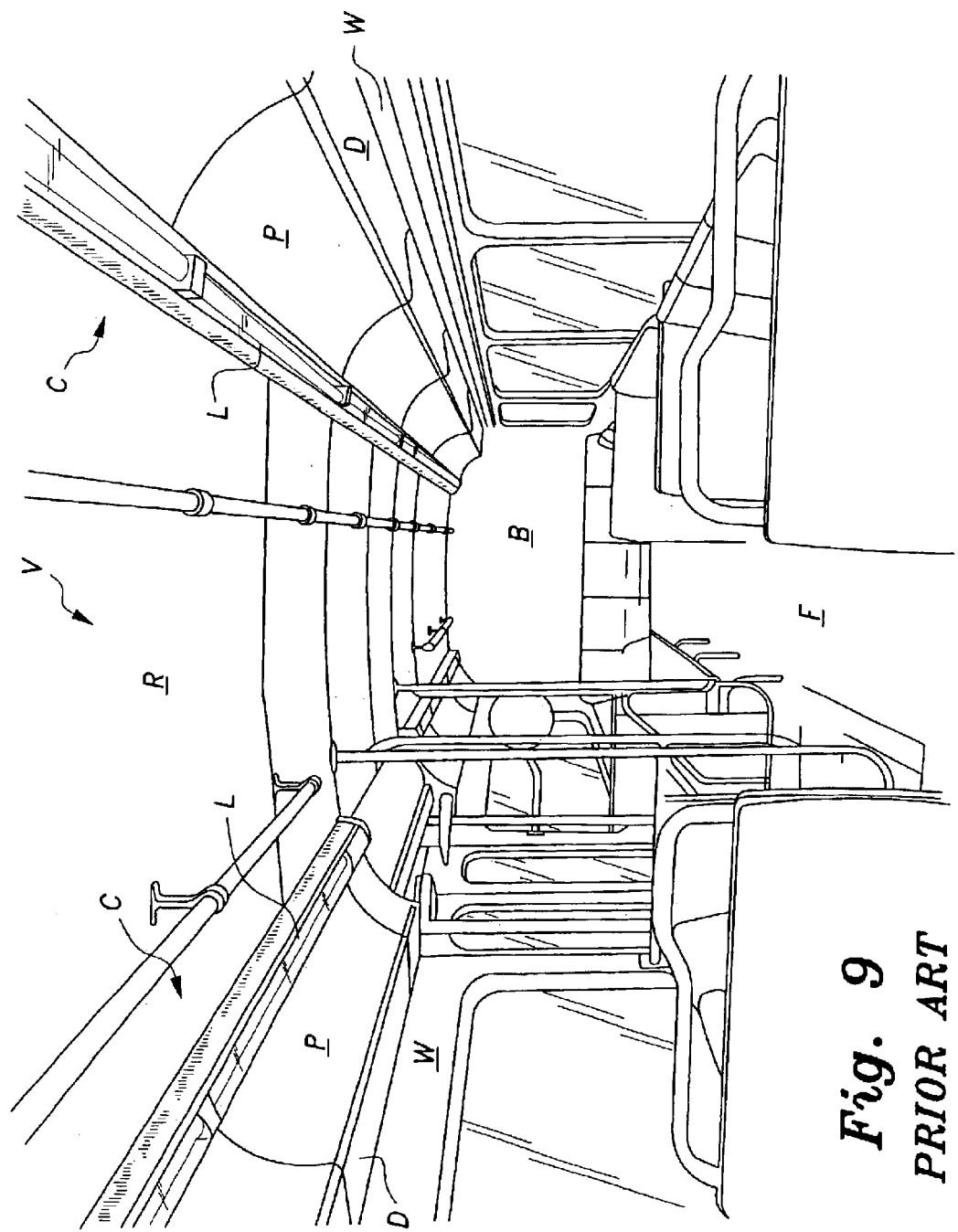
FIG. 9 is a prior art illustration of combination light fixture/HVAC duct/advertising cardholders as installed in a public transportation vehicle.

Referring to FIG. 9, there is shown a prior combined light fixture/HVAC duct/advertising cardholder as installed in a public transportation vehicle V. Vehicle V has a roof R, a floor F, and walls W. Combined units C include light fixtures L, HVAC ducts D, and advertising cardholder panels P.

The present invention may have a range of sizes of the combination unit of portions thereof as required for installation in a particular vehicle. The inventive unit is preferably constructed of aluminum with lightweight aluminum-plastic panel materials.

It is to be understood that the present invention is not limited to the embodiments described above, but encompasses any and all embodiments within the scope of the following claims.

I claim:

1. A combination light fixture, HVAC duct and advertising card holder for public transportation vehicles, the vehicles having at least one sidewall and a roof, said combination light fixture, HVAC duct, and advertising card holder comprising:

a roof-mounted light fixture having a reflector and a housing mounted along the length of said roof, said housing having an inboard mounting portion and an outboard lamp portion, said outboard lamp portion having a fixed female portion of a detachable hinge at its lower inboard end;

a combined ventilating and advertising panel having an upper end and a lower end and having an upper ventilation portion extending downward from said upper end, a concave advertising panel card display portion, and a horizontal base ventilation portion extending to said lower end;

said panel upper end having a male detachable hinge portion of such configuration and dimensions as to detachably fit within said female detachable hinge portion for alternate upward rotation to a closed position and downward rotation to an open position; and a sidewall mounted flange for removable attachment to said combined panel at its said horizontal base portion lower end when said combined panel is in a closed position;

whereby said combined panel serves as a duct for moving air and an outer lighted surface for display of advertising cards;

whereby said combined panel may be detached at its lower end from said sidewall and rotated downward on said hinge for service access to said duct or removed entirely; and whereby said combined panel may be rotated upward and re-attached to said sidewall.

2. The combination light fixture, HVAC duct and advertising card holder of claim 1, wherein said upper ventilation portion and said horizontal base ventilation portion of said combined panel each define a plurality of spaced elongated vents for distribution of ventilation air from said duct to the interior of said public transportation vehicles.

3. The combination light fixture, HVAC duct and advertising card holder of claim 1, wherein said light reflector in said outboard lamp portion has a sidewall at each end, thereof, said sidewalls having opposing light sockets for receiving a fluorescent bulb and define wiring access apertures and said housing has a removable lens for desired distribution of light from said lamp portion for access to change said fluorescent bulb.

4. The combination light fixture, HVAC duct and advertising cardholder of claim 1, wherein said male hinge is mounted on said combined panel upper end by means of double-sided tape.

5. The combination light fixture, HVAC duct and advertising card holder of claim 4, wherein said roof mounted light fixture mounting portion has an upper wall attached to said roof by fasteners and a lower wall having a snap-in strip to cover said attachment fasteners.

6. The combination light fixture, HVAC duct and advertising card holder of claim 4, wherein said male hinge has an integral, longitudinal bracket portion having a double sided tape attaching surface, a hook portion for insertion of said female hinge portion of said lamp housing, said bracket portion and said hook portion extending perpendicularly from a body portion, said body portion having a panel end capturing lip extending parallel with said tape attaching surface and spaced therefrom to encase said panel upper end when inserted against said body portion at a panel end locating surface thereon.

7. The combination light fixture, HVAC duct and advertising card holder of claim 1, further comprising parallel opposing advertising card holding members mounted along said concave card display portion of said combined panel, respectively, and spaced to receive advertising cards at their upper and lower edges.

8. The combination light fixture, HVAC duct and advertising card holder of claim 7, wherein said advertising card holding members are mounted to the outer side of said combined panel by means of double sided tape.

9. The combination light fixture, HVAC duct and advertising card holder of claim 8, said advertising card holding members having molded end finishers having securing legs, said holding members having respective ends at each end of said combined panel, and said finishers are respectively secured in each end thereof by said securing legs being inserted therein.

10. A combination light fixture, HVAC duct and advertising card holder for public transportation vehicles, the vehicles having at least one sidewall and a roof, said combination light fixture, HVAC duct, and advertising card holder comprising:

an inboard advertising card panel portion;

an outboard duct panel portion having a plurality of air vents therethrough; and a light fixture supported between said outboard duct panel portion and said inboard card panel portion;

said light fixture having a housing having a generally inverted "U"-shape and having an outboard panel connector and an inboard female panel hinge;

said outboard panel connector being attached to said inboard edge of said horizontal duct panel;

said inboard card panel portion having a concave card panel generally sloping upward and inward and having a lower edge and an upper edge, said lower edge having a male hinge mounted along its lower edge, said upper edge having an upper panel connecting bracket for connection with said roof;

said male hinge of said concave card panel being of such proportions and dimensions as to be detachably mounted in said inboard female panel hinge of said light fixture housing for rotation of said concave card panel from a closed upward position to an open downward position;

whereby said combination duct, light fixture and advertising card holder panel serves as a duct for moving air and an outer lighted surface for display of advertising cards;

whereby said advertising card holder panel may be detached at its upper end relative to said roof and rotated downward on said hinge for service access to said light fixture duct or removed entirely; and whereby said combined panel may be rotated upward and its upper end fastened in place relative to said roof.

11. The combination light fixture, HVAC duct and advertising cardholder of claim 10, further comprising light housing support straps extending vertically downward from said roof, said light fixture housing having a light housing support flange extending upward therefrom for attachment with said support straps by means of fasteners.

12. The combination light fixture, HVAC duct and advertising card holder of claim 10, said male hinge portion having a connecting member having a flat cardholding panel connecting surface, a panel locating flange spaced from the capturing lip thereof and defining a receiver for the lower edge of said advertising card, said card holding panel being attached to said flat card holding panel surface with double-sided tape.

13. The combination light fixture, HVAC duct and advertising card holder of claim 10, wherein said light housing defines a generally rectangular aperture in its outboard side, said light fixture further comprising a ballast connected with a ballast plate, said ballast plate being removably mounted on the inner side of said housing around the periphery of said aperture such that said ballast extends through said aperture into said duct, said ballast plate defining a fuse aperture and an LED readout aperture such that the fuse for said ballast may be replaced and the status of the ballast may be read without dismounting said ballast and ballast wall from said light housing.

14. The combination light fixture, HVAC duct and advertising card holder of claim 10, said light fixture having a light housing outboard duct panel connector, a vertical locating leg and a capturing lip, said duct panel connector having a flat surface for attachment of said outboard duct panel by means of double-sided tape.

15. The combination light fixture, HVAC duct and advertising card holder of claim 10, wherein said panel is of aluminum sandwich construction having a plastic core.

16. The combination light fixture, HVAC duct and advertising cardholder of claim 15, wherein said panel is about two mm. in overall thickness and having two outer sheets of about 0.012 in. aluminum sheet boned to a thermoplastic core.

17. The combination light fixture, HVAC duct and advertising card holder of claim 10, further comprising an upper support wall extending vertically between said roof and said panel upper connecting member, said upper support wall having a lower end having a support fastener flange extending horizontally for removable attachment of said panel upper connecting bracket by means of a fastener.

18. The combination light fixture, HVAC duct and advertising card holder of claim 17, said panel upper connecting bracket having a top horizontal fastening wall, an outer downwardly sloped panel wall having a lower end, said lower end being connected to said upper end of said card holding panel, said lower end of said wall having a strip receiver flange.

19. The combination light fixture, HVAC duct and advertising card holder of claim 18, wherein said panel upper connecting bracket has a vertical depending inner wall having a lower end with an outer extending advertising card holding receiver, said receiver defining a card holding groove and having an upwardly spaced cover strip receiver flange, said panel upper connecting bracket having a cover strip having parallel spaced snaps which are configured and dimensioned to fit between said cover strip flanges, said cover strip defining access holes aligned with said fasteners, whereby said cover strip covers the inner portion of said upper panel connecting bracket while allowing access to said fasteners for removal of said card holding panel.

20. The combination light fixture, HVAC duct and advertising cardholder of claim 10, wherein said outboard panel connector of said light fixture includes a generally rectangular, upward opening wiring trough.

21. The combination light fixture, HVAC duct and advertising card holder of claim 20, wherein said light housing has inset opposing end walls having outward extending connecting flanges, said endwalls having lamp sockets centrally mounted therein, said light housing having aligned apertures having hollow center fasteners extending through said aligned apertures and crimped for permanent attachment of said endwalls to said light housing and for receiving respective electrical wiring, whereby said wiring extends from said lamp sockets to said wiring trough attached therethrough.

22. The combination light fixture, HVAC duct and advertising card holder of claim 21, wherein said panel is of aluminum sandwich construction having a plastic core.

23. The combination light fixture, HVAC duct and advertising cardholder of claim 22, wherein said panel is about two mm. in overall thickness and having two outer sheets of about 0.012 in. aluminum sheet boned to a thermoplastic core.

* * * * *